United States Patent
Ding et al.

(10) Patent No.: US 10,638,820 B2
(45) Date of Patent: May 5, 2020

(54) CARRYING DEVICE AND METHOD OF CONTROLLING THE SAME

(71) Applicant: BOE TECHNOLOGY GROUP CO., LTD., Beijing (CN)

(72) Inventors: Hongli Ding, Beijing (CN); Yu Gu, Beijing (CN); Zhongcheng Gui, Beijing (CN); Yifei Zhang, Beijing (CN); Kai Zhao, Beijing (CN); Ying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 270 days.

(21) Appl. No.: 15/527,053

(22) PCT Filed: Jun. 27, 2016

(86) PCT No.: PCT/CN2016/087238
§ 371 (c)(1),
(2) Date: May 16, 2017

(87) PCT Pub. No.: WO2017/177552
PCT Pub. Date: Oct. 19, 2017

(65) Prior Publication Data
US 2019/0090601 A1    Mar. 28, 2019

(30) Foreign Application Priority Data
Apr. 13, 2016    (CN) .......................... 2016 1 0228296

(51) Int. Cl.
*G01C 22/00* (2006.01)
*A45C 5/14* (2006.01)
(Continued)

(52) U.S. Cl.
CPC .................. *A45C 5/14* (2013.01); *A45C 5/03* (2013.01); *G05D 1/02* (2013.01); *G05D 1/0214* (2013.01);
(Continued)

(58) Field of Classification Search
CPC .......... A45C 5/14; A45C 5/03; G05D 1/0246; G05D 1/0214; G05D 2201/02; B60B 19/003; B60K 7/0007
(Continued)

(56) References Cited

U.S. PATENT DOCUMENTS

| 10,353,065 B2 * | 7/2019 | Heimberger | |
| 2002/0171739 A1 * | 11/2002 | Yamada | B60R 1/00 348/148 |

(Continued)

FOREIGN PATENT DOCUMENTS

| CN | 102411371 A | 4/2012 |
| CN | 102894600 A | 1/2013 |

(Continued)

OTHER PUBLICATIONS

International Search Report and Written Opinion, English Translation.
(Continued)

*Primary Examiner* — Shardul D Patel
(74) *Attorney, Agent, or Firm* — Brooks Kushman P.C.

(57) ABSTRACT

A carrying device and a method for controlling the carrying device are provided. The carrying device includes a body and a movement mechanism arranged at a bottom of the body and capable of moving in various directions. The carrying device further includes: an object information detector arranged on the body and configured to collect object information about an object in front of the body; a driving mechanism connected to the movement mechanism
(Continued)

and configured to drive the movement mechanism to move; and a control mechanism configured to determine a position of a target object based on the object information, and output a control instruction to the driving mechanism to enable the movement mechanism to drive the body to follow the target object.

18 Claims, 3 Drawing Sheets

(51) Int. Cl.
  *G05D 1/02* (2020.01)
  *A45C 5/03* (2006.01)
  *B60B 19/00* (2006.01)
  *B60K 7/00* (2006.01)

(52) U.S. Cl.
  CPC .......... *G05D 1/0246* (2013.01); *B60B 19/003* (2013.01); *B60K 7/0007* (2013.01); *B60Y 2200/86* (2013.01); *B60Y 2400/30* (2013.01); *G05D 2201/02* (2013.01)

(58) Field of Classification Search
  USPC ...... 701/2, 23, 28; 340/572.7; 180/167, 214; 700/258, 259
  See application file for complete search history.

(56) References Cited

U.S. PATENT DOCUMENTS

| | | | | |
|---|---|---|---|---|
| 2002/0174506 | A1* | 11/2002 | Wallach | A47L 5/36 15/319 |
| 2004/0129469 | A1* | 7/2004 | Kader | A45C 5/14 180/167 |
| 2008/0024306 | A1* | 1/2008 | Bomber | G06K 7/10881 340/572.7 |
| 2008/0164086 | A1* | 7/2008 | Ho | B62D 61/065 180/214 |
| 2010/0300837 | A1* | 12/2010 | Kosuge | E04H 6/245 198/464.1 |
| 2012/0316680 | A1* | 12/2012 | Olivier, III | G05D 1/0246 700/258 |
| 2013/0274987 | A1* | 10/2013 | Lee | G05D 1/0251 701/28 |
| 2014/0107868 | A1* | 4/2014 | DiGiacomcantonio | A45C 5/14 701/2 |
| 2014/0379130 | A1* | 12/2014 | Lee | B62D 1/02 700/259 |
| 2016/0320477 | A1* | 11/2016 | Heimberger | B60W 30/06 |
| 2017/0220040 | A1* | 8/2017 | London | G05D 1/0278 |

FOREIGN PATENT DOCUMENTS

| | | |
|---|---|---|
| CN | 103608741 A | 2/2014 |
| CN | 102393739 B | 12/2014 |
| CN | 104905520 A | 9/2015 |
| CN | 105005305 A | 10/2015 |
| CN | 204925791 U | 12/2015 |
| CN | 205507544 U | 8/2016 |
| JP | 10210409 A | 1/1990 |
| JP | 2013235505 A | 11/2013 |
| WO | 2013168452 A1 | 11/2013 |

OTHER PUBLICATIONS

CN104905520A, English Abstract and Machine Translation.
CN102894600A, English Abstract and Machine Translation.
CN102411371A, English Abstract and Machine Translation.
CN204925791U, English Abstract and Machine Translation.
CN102393739B, English Abstract and Machine Translation.
1$^{st}$ Chinese Office Action, English Translation.
CN103608741A, English Abstract and U.S. Equivalent U.S. Pub. No. 2012/0316680.
CN105005305A, English Abstract and Machine Translation.
CN205507544U, English Abstract.
JPH0210409A, English Abstract and Machine Translation.
JP2013235505A, English Abstract and Machine Translation.
WO2013168452A1, English Abstract.
International Search Report and Written Opinion for Application No. PCT/CN2016/087238, dated Jan. 16, 2017, 10 Pages.
First Office Action for Chinese Application No. 201610228296.1, dated Feb. 2, 2018, 8 Pages.

* cited by examiner

CARRYING DEVICE AND METHOD OF CONTROLLING THE SAME

CROSS-REFERENCE TO RELATED APPLICATIONS

This application is the U.S. national phase of PCT Application No. PCT/CN2016/087238 filed on Jun. 27, 2016, which claims priority to Chinese Patent Application No. 201610228296.1 filed on Apr. 13, 2016, the disclosures of which are incorporated in their entirety by reference herein.

TECHNICAL FIELD

The present disclosure relates to the field of intelligent control technology, in particular to a carrying device and a method of controlling the carrying device.

BACKGROUND

Usually, when shopping or travelling out, people need to carry luggage or carts. Most of commonly used luggage and carts are handheld or have a draw-bar, and users need to carry or pull them when walking, which is labor-consuming and inconvenient. Hence, there is an urgent need in the art to provide luggage capable of following a user automatically, so as to free up the user's hands and remarkably improve the convenience.

SUMMARY

(1) Technical Problem to be Solved

The present disclosure provides a carrying device and a method of controlling the carrying device, so as to identify a user and autonomously follow the user.

(2) Technical Solution

In one aspect, the present disclosure provides in some embodiments a carrying device. The carrying device includes: a body; a movement mechanism arranged at a bottom of the body and capable of moving in a plurality of directions; an object information detector arranged on the body and configured to collect object information about each object in front of the body; a driving mechanism connected to the movement mechanism and configured to drive the movement mechanism to move; and a control mechanism configured to determine a position of a target object based on the object information, and output a control instruction to the driving mechanism to enable the movement mechanism to drive the body to follow the target object.

In a possible embodiment of the present disclosure, the object information detector includes a distance sensor configured to acquire a distance signal of the object in front of the body. The control mechanism includes a first controller configured to determine the position of the target object based on the distance signal.

In a possible embodiment of the present disclosure, the object information detector includes a distance sensor configured to acquire a distance signal of the object in front of the body, and an image collection mechanism configured to acquire a current image of the object in front of the body. The control mechanism includes a second controller configured to determine the position of the target object based on the distance signal and the current image.

In a possible embodiment of the present disclosure, the movement mechanism includes a plurality of Mecanum wheels, preferably at least four Mecanum wheels, and more preferably four Mecanum wheels.

In a possible embodiment of the present disclosure, the driving mechanism includes a hub motor and a driver connected to the hub motor. The hub motor is connected to the Mecanum wheels, and the driver is connected to the control mechanism.

In a possible embodiment of the present disclosure, the distance sensor is an ultrasonic sensor.

In a possible embodiment of the present disclosure, the control mechanism is connected to the distance sensor via a RS232 interface.

In a possible embodiment of the present disclosure, the control mechanism is connected to the image collection mechanism via a Universal Serial Bus (USB) interface.

In a possible embodiment of the present disclosure, the body includes an accommodation space for carrying an article.

In another aspect, the present disclosure provides in some embodiments a method for controlling the above-mentioned carrying device. The method includes: acquiring object information from an object information detector; and determining a position of a target object based on the object information, and outputting a control instruction to a driving mechanism to enable a movement mechanism to drive a body of the carrying device to follow the target object.

In a possible embodiment of the present disclosure, in the event that the object information detector includes a distance sensor, the step of determining a position of a target object based on the object information, and outputting a control instruction to the driving mechanism to enable the movement mechanism to drive the body of the carrying device to move along with the target object includes: simulating a profile feature of the object in front of the body based on a distance signal of the object in front of the body acquired by the distance sensor, matching the simulated profile feature of the object in front of the body with a pre-stored model of the target object, and determining a current position of the target object based on a matching result; and determining whether the current position is located within a predetermined following range, and if not, outputting a movement state adjustment instruction to the driving mechanism to enable the movement mechanism to drive the body to follow the target object.

In a possible embodiment of the present disclosure, the step of matching the simulated profile feature of the object in front of the body with a pre-stored model of the target object and determining a current position of the target object based on a matching result includes: determining whether one of the simulated profile feature of the object corresponds to the pre-stored model of the target object; if yes, determining the one of the simulated profile feature corresponding to the pre-stored model of the target object as a computed target profile, and calculating a distance between a center of the computed target profile and the distance sensor and an angle of the center of the computed target profile relative to the distance sensor to determine the current position of the target object; and if not, determining that the current position of the target object is located beyond the predetermined following range.

In a possible embodiment of the present disclosure, the step of outputting a movement state adjustment instruction to the driving mechanism includes outputting a movement speed adjustment instruction and/or a rotation direction adjustment instruction to the driving mechanism.

In a possible embodiment of the present disclosure, in the event that in the step of determining whether the current position is located within a predetermined following range, the current position is determined to be located within the predetermined following range, the method further includes: determining whether a current distance between the body and the target object is less than a predetermined value based on the current position, and if yes, outputting a following stopping instruction to the driving mechanism.

In a possible embodiment of the present disclosure, in the event that the object information detector includes a distance sensor and an image collection mechanism, the step of acquiring object information from the object information detector includes: acquiring a first distance signal of the object in front of the body from the distance sensor and a current image of the object in front of the body from the image collection mechanism. The step of determining a position of the target object based on the object information and outputting a control instruction to the driving mechanism to enable the movement mechanism to drive the body to follow the target object includes: simulating a profile feature of the object in front of the body based on the first distance signal, matching the simulated profile feature of the object in front of the body with a pre-stored model of the target object, and determining a current position of the target object based on a matching result; in the event that the current position is located within a predetermined following range, matching the current image with pre-stored image information about the target object to determine whether the current image includes the pre-stored image information; and in the event that the current image does not include the pre-stored image information and the current position is not located within the predetermined following range, outputting a movement state adjustment instruction to the driving mechanism.

In a possible embodiment of the present disclosure, the step of matching the simulated profile feature of the object in front of the body with a pre-stored model of the target object and determining a current position of the target object based on a matching result includes: determining whether one of the simulated profile feature of the objects corresponds to the pre-stored model of the target object; if yes, determining the one of the simulated profile feature corresponding to the pre-stored model of the target object as a computed target profile, and calculating a distance between a center of the computed target profile and the distance sensor and an angle of the center of the computed target profile relative to the distance sensor to determine the current position of the target object; and if not, determining that the current position of the target object is located beyond the predetermined following range.

In a possible embodiment of the present disclosure, the step of outputting a movement state adjustment instruction to the driving mechanism includes outputting a movement speed adjustment instruction and/or a rotation direction adjustment instruction to the driving mechanism.

In a possible embodiment of the present disclosure, the method further includes, prior to the step of acquiring a first distance signal of the object in front of the body from the distance sensor and a current image of each object in front of the body from the image collection mechanism: receiving a start instruction; acquiring a second distance signal of the object in front of the body from the distance sensor based on the start instruction; and performing a feature simulation based on the second distance signal to acquire and store the pre-stored model.

In a possible embodiment of the present disclosure, the method further includes, subsequent to the step of performing a feature simulation based on the second distance signal to acquire and store the pre-stored model: outputting a rotation direction adjustment instruction to the driving mechanism to change a direction of the movement mechanism, and enabling the image collection mechanism to face toward the target object and collect image information about the target object and store the image information as the pre-stored image information.

In a possible embodiment of the present disclosure, the method further includes, subsequent to the step of enabling the image collection mechanism to collect image information about the target object: determining whether a stored image exists, and if yes, deleting the stored image, and storing the currently-collected image information as the pre-stored image information.

In a possible embodiment of the present disclosure, in the event that in the step of determining whether the current position is located within a predetermined following range, the current position is determined to be located within the predetermined following range, the method further includes: determining whether a current distance between the body and the target body is less than a predetermined value based on the current position, and if yes, outputting a following stopping instruction to the driving mechanism.

(3) Beneficial Effect

According to the embodiments of the present disclosure, the movement mechanism may be capable of moving in various directions (transversely, obliquely and so on), the object information detector may detect object information about the object in front of the body, the control mechanism may determine the position of the target object based on the object information, and the driving mechanism may control the movement mechanism to move toward and follow the target object. As a result, the carrying device may identify the target object and has the autonomous moving capability, and thus the carrying device may follow the target object.

BRIEF DESCRIPTION OF THE DRAWINGS

In order to illustrate the technical solutions of the present disclosure or the related art in a clearer manner, the drawings used in the present disclosure or the related art will be described hereinafter briefly. Apparently, the following drawings merely relate to some embodiments of the present disclosure, and based on these drawings, a person skilled in the art may obtain other drawings without any creative effort.

DETAILED DESCRIPTION

Figure 1:
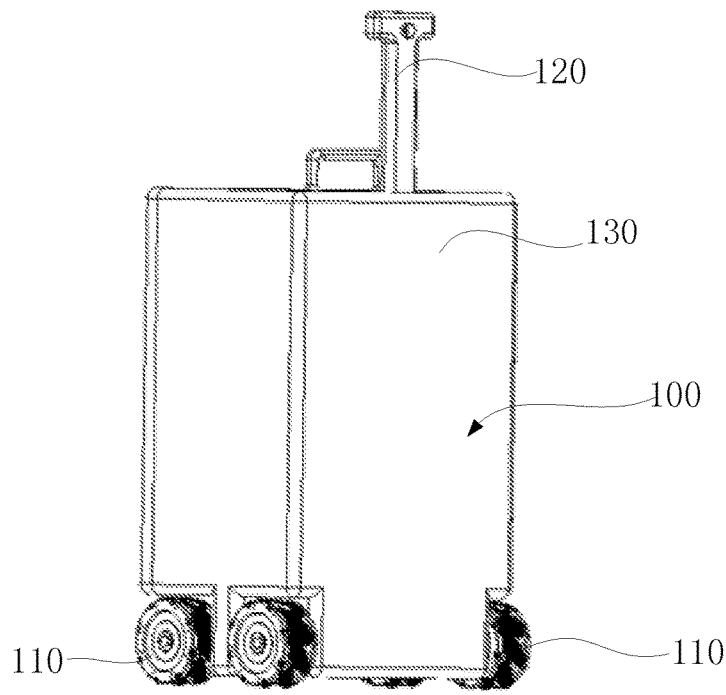
FIG. 1 is a schematic view showing a carrying device according to the present disclosure.

The present disclosure will be further described hereinafter in detail with reference to accompanying drawings and embodiments. The following embodiments are merely illustrative of the present disclosure and are not intended to limit the scope of the present disclosure.

In order to make the objects, the technical solutions and the advantages of the embodiments of the present disclosure more clear, technical solutions of the embodiments of the present disclosure will be described hereinafter clearly and completely in conjunction with the drawings. Apparently, the described embodiments merely relate to a part of, rather than all of, the embodiments of the present disclosure, and based on these embodiments, a person skilled in the art may, without any creative effort, obtain other embodiments, which also fall within the scope of the present disclosure.

Unless otherwise defined, any technical or scientific term used herein shall have the common meaning understood by a person of ordinary skill. Such words as "first" and "second" used in the specification and claims of the present disclosure are merely used to differentiate different components rather than to represent any order, number or importance. Similarly, such words as "a" or "an" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of a described object is changed, the relative position relationship will be changed too.

In order to make technical problems, technical solutions and advantages of the present disclosure more clear, the following descriptions are given in conjunction with the drawings and embodiments.

The present disclosure provides in some embodiments a carrying device, including: a body; a movement mechanism arranged at the bottom of the body and capable of moving in a plurality of directions; an object information detector arranged on the body and configured to collect object information about an object in front of the body; a driving mechanism connected to the movement mechanism and configured to drive the movement mechanism to move; and a control mechanism configured to obtain the object information, determine a position of a target object, and output a control instruction to the driving mechanism to enable the movement mechanism to drive the body to follow the target object.

According to the embodiments of the present disclosure, the movement mechanism may be capable of moving in various directions (transversely, obliquely and so on), the object information detector may detect the information about the object in front of the body, the control mechanism may determine the position of the target object in accordance with the information acquired by the object information detector to enable the driving mechanism to control the movement mechanism to move toward and follow the target object. As a result, the carrying device may identify the target object and have the fully autonomously walking capability, and thus may follow the target object.

In the embodiments of the present disclosure, the combination of the movement mechanism capable of moving in various directions, the object information detector, the driving mechanism and the control mechanism is a key point for the carrying device to identify and autonomously follow the target object.

In addition, the carrying device may further include an accommodation space for carrying articles. The carrying device may be a suitcase, a luggage case or a trolley for shopping or travelling.

The specific structure of the carrying device having an autonomous following function of the present disclosure will be described hereinafter by taking a luggage case as an example.

FIG. 1 illustrates a schematic view showing a carrying device according to embodiments of the present disclosure. The carrying device includes a body 100 (i.e., a body of the luggage case) and a movement mechanism. The body 100 includes an accommodation space for carrying an article. The movement mechanism is arranged at the bottom of the body 100. In the embodiments of the present disclosure, the movement mechanism includes a plurality of Mecanum wheels 110. Each Mecanum wheel includes a plurality of small rollers arranged obliquely on the circumference. A resultant force may be generated in any direction on the basis of rotation directions and speeds of the small rollers, so as to enable the entire device to move in the direction of the resultant force freely, without any change in the direction of the wheel connected with the small rollers. According to the above-mentioned principle, it is possible for the Mecanum wheels to move in all directions, e.g., to move forward, move transversely, move obliquely, rotate, or a combination thereof. Hence, in the event that the Mecanum wheels are mounted at the bottom of the body 100 of the carrying device, it is possible for the body 100 to move in all directions, without any change in the direction of the body 100.

In addition, in order to enable the body 100 to move stably in all directions through the Mecanum wheels 110, a plurality of Mecanum wheels, e.g., at least four Mecanum wheels, may be provided. In a possible embodiment of the present disclosure, four Mecanum wheels 110 may be provided, as shown in FIG. 1.

In some embodiments of the present disclosure, in the carrying device, the body 100 may further include a draw bar 120 arranged at the top of the body 100, so as to facilitate a push-and-pull operation.

Figure 2:
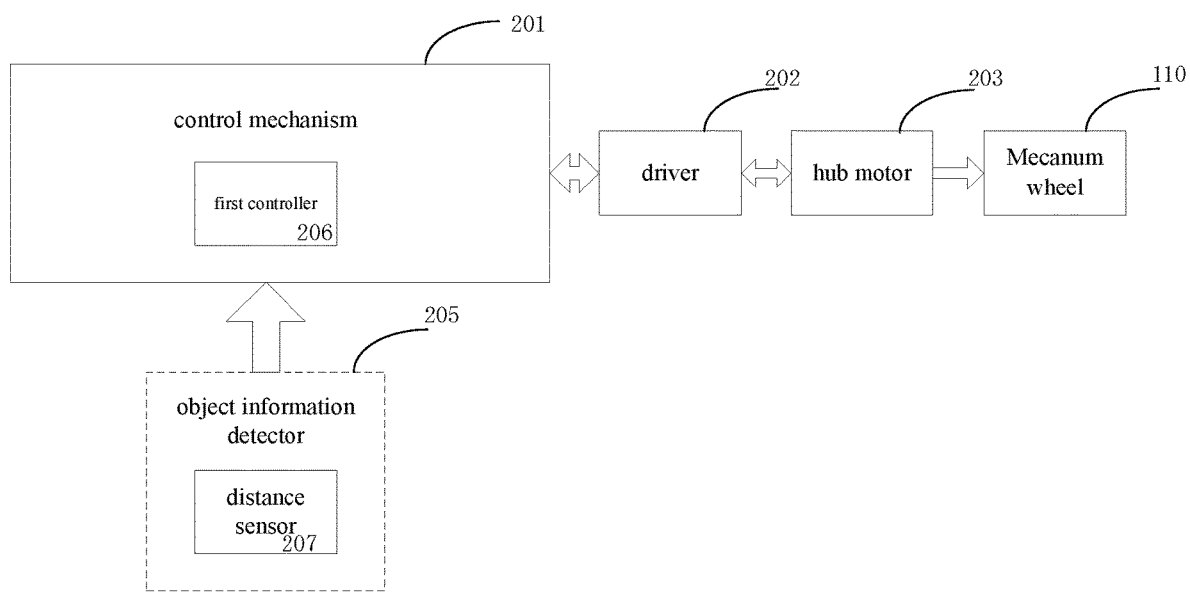
FIG. 2 is a circuit diagram of a carrying device according to a first embodiment of the present disclosure.
Figure 3:
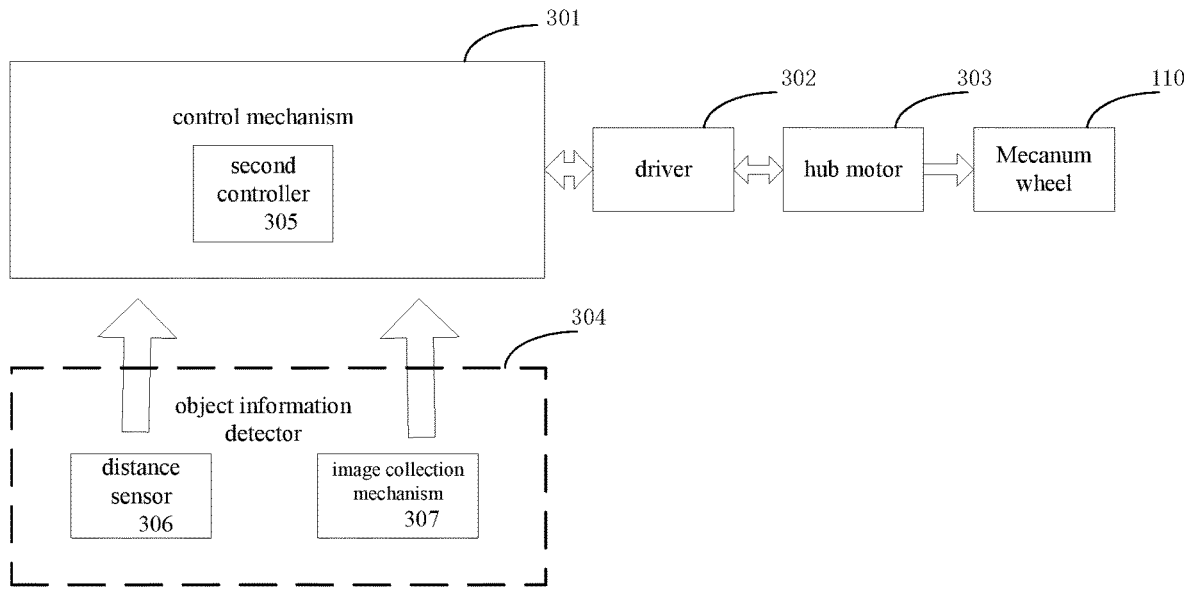
FIG. 3 is a circuit diagram of a carrying device according to a second embodiment of the present disclosure.

As shown in FIGS. 2 and 3, the carrying device may further include an object information detector 205, a driving mechanism and a control mechanism 201. The object information detector 205 may be arranged on the body 100, and configured to acquire object information about objects in front of the body 100. To be specific, the object information detector 205 may be arranged at a first end surface 130 of the box-type body 100 as shown in FIG. 1. The first end surface 130 is just a front end surface of the body 100 when the body 100 follows the target object, i.e., an end surface facing the target object. The driving mechanism may be connected to the movement mechanism, i.e., to the plurality of Mecanum wheels 110, and configured to drive the Mecanum wheels 110 to move. To be specific, the driving mechanism may be arranged at the bottom of the body 100 and at a position close to the Mecanum wheels 110. The control mechanism 201 may be configured to acquire the object information from the object information detector 205, determine a position of the target object, and output a control instruction to the driving mechanism, so as to enable the movement mechanism to drive the body to follow the target object. To be specific, the control mechanism 201 may be arranged on the body 100 and include a control chip connected to the driving mechanism.

As shown in FIG. 2, in the first embodiment of the present disclosure, the object information detector 205 may include a distance sensor 207 configured to acquire a distance signal of the object in front of the body 100. The control mechanism 201 may include a first controller 206 configured to determine the position of the target object in accordance with the distance signal.

To be specific, the distance sensor 207 may be an ultrasonic sensor. A plurality of ultrasonic sensors may be provided at different positions. The first controller 206 may determine the position of the target object based on the distance signal acquired by the ultrasonic sensors. Certainly, it should be appreciated that, any other kind of sensor may also be used as the distance sensor 207, and the present disclosure is not limited.

In addition, in the first embodiment of the present disclosure, the driving mechanism may include a hub motor 203 and a driver 202 connected to the hub motor 203. The hub motor 203 may be connected to the Mecanum wheels 110 as shown in FIG. 1, and the driver 202 may be connected to the control mechanism 201. In the present embodiment, the driver 202 may be connected to the first controller 206 via a RS485 interface or Ethernet. The hub motor 203 may be mounted inside a hub of each Mecanum wheel 110, so as to save space.

To be specific, in the first embodiment of the present disclosure, the control mechanism 201, i.e., the first controller 206, may be connected to the ultrasonic sensor via a RS232 interface, so as to ensure a transmission rate and accuracy of data transmitted between the first controller 206 and the ultrasonic sensor.

In the first embodiment of the present disclosure, the first controller 206 of the control mechanism 201 may be a control chip. The control chip may be used to acquire the distance signal detected by the ultrasonic sensor, determine the position of the target object, and output the control instruction to the driver 202 of the driving mechanism based on the determined position of the target object, so as to enable the driver 202 to output a speed adjustment instruction and/or a rotation direction adjustment instruction to the hub motor 203, thereby changing the rotation speed and/or the movement direction of each Mecanum wheel 110. In this way, it is possible for the carrying device to keep pace with the target object and autonomously follow the target object.

Further, the present disclosure provides another circuit structure of the carrying device. As shown in FIG. 3, in a second embodiment of the present disclosure, the object information detector may include a distance sensor 306 configured to acquire a distance signal of the object in front of the body 100, and an image collection mechanism 307 configured to acquire a current image of the object in front of the body. The control mechanism 301 may include a second controller 305 configured to determine the position of the target object based on the distance signal and the current image.

To be specific, the distance sensor 306 may be an ultrasonic sensor. A plurality of ultrasonic sensors may be provided at different positions. The image collection mechanism 307 may be a camera. The second controller 305 may determine the position of the target object based on the distance signal acquired by the ultrasonic sensor and the current image collected by the camera.

In addition, identical to the above-mentioned embodiment, in the present embodiment of the present disclosure, the driving mechanism may include a hub motor 303 and a driver 302 connected to the hub motor 303. The hub motor 303 may be connected to the Mecanum wheels 110 as shown in FIG. 1, and the driver 302 may be connected to the control mechanism 301. In the present embodiment, the driver 302 may be connected to the second controller 305 via a RS485 interface or Ethernet. The hub motor 303 may be mounted inside a hub of each Mecanum wheel 110, so as to save space.

To be specific, in the second embodiment of the present disclosure, the control mechanism 301, i.e., the second controller 305, may be connected to the ultrasonic sensor via a RS232 interface and to the camera via a USB interface. The connection between the second controller 305 and the ultrasonic sensor and between the second controller 305 and the camera needs to ensure the transmission rate and accuracy of collected data.

Similarly, in the second embodiment of the present disclosure, the second controller 305 of the control mechanism 301 may also be a control chip, which may be used to acquire the distance signal from the ultrasonic detector and the current image from the camera, determine the position of the target object. The second controller 305 may output the control instruction to the driver 302 of the driving mechanism based on the determined position of the target object, so as to enable the driver 302 to generate and output a speed adjustment instruction and/or a rotation direction adjustment instruction to the hub motor 303, thereby changing the rotation speed and/or the movement direction of each Mecanum wheel 110. In this way, it is possible for the carrying device to keep pace with the target object and autonomously follow the target object.

In addition, in the circuit control structures of the carrying device in the first and second embodiments of the present disclosure, the control mechanism, the hub motor and the driver may be arranged at the bottom of the body 100. In addition, a power source (not shown) may also be arranged at the bottom of the body 100, so as to provide electric energy to the electronic elements.

Methods for controlling the carrying device having the above-mentioned two control circuit structures provided by the embodiments of the present disclosure will be described hereinafter respectively.

Figure 4:
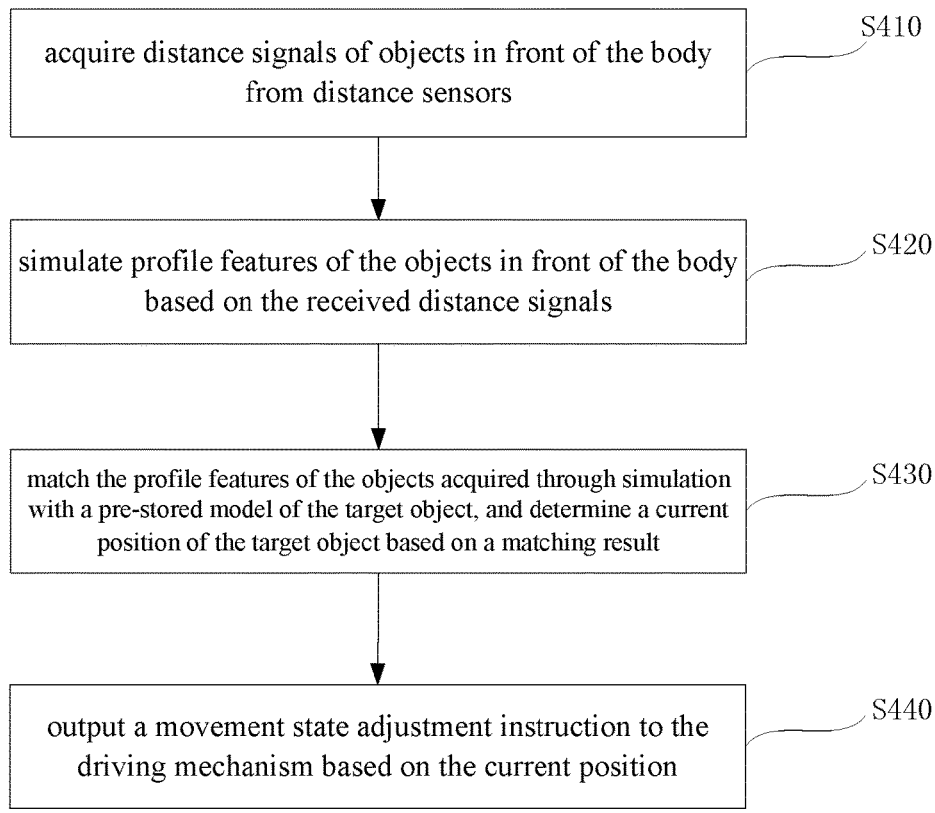
FIG. 4 is a flow chart of a method for controlling the carrying device according to the first embodiment of the present disclosure.

In the event that the carrying device includes the control circuit structure in the first embodiment as shown in FIG. 2, the concrete processes of determining the position of the target object based on object information and outputting the control instruction to the driving mechanism so as to enable the movement mechanism to drive the body to follow the target object may include the following steps S410 to S440, as shown in FIG. 4.

Step S410: acquire distance signals of objects in front of the body 100 from distance sensors (i.e., ultrasonic sensors).

To be specific, the plurality of ultrasonic sensors may transmit a plurality of ultrasonic signals in different directions to different positions in front of the body 100, and then receive the ultrasonic signals reflected by the objects in front of the body 100. Hence, the distance signal may include a plurality of reflected ultrasonic signals.

Step S420: simulate profile features of the objects in front of the body based on the received distance signals.

To be specific, it should be appreciated that, the ultrasonic signals reflected by an identical object may have an identical feature. Upon the acquisition of data of the reflected ultrasonic signals, abnormal data points in the data may be filtered out using a median filtration algorithm. Then, the resultant data may be processed, i.e., subjected to clustering analysis using a nearest neighbor algorithm, so as to classify data points in the resultant data and simulate profile features of the objects from which the ultrasonic signals are reflected.

Step S430: match the profile features of the objects acquired through simulation with a pre-stored model of the target object, and determine a current position of the target object based on a matching result. It should be appreciated that, different objects may have different profiles. In the event that the carrying device is a luggage case, the ultrasonic sensors arranged on the luggage case may transmit, in accordance with a normal height of the luggage case, the ultrasonic signals to positions corresponding to users' legs, and the legs of different users may have different profiles. In the embodiments of the present disclosure, the pre-stored model of the target object, i.e., profiles of the legs of the users of the luggage case, may be stored in a format capable of being read by the controller. In the case of matching the acquired profile features of the objects with the pre-stored model, the profile of the object that is identical to the profile indicated by the pre-stored model is the profile of the user's leg which the luggage case follows and may be determined as the computed target profile. Then, a distance between a center of the computed target profile and the ultrasonic sensor and an angle of the center of the computed target profile relative to the ultrasonic sensor may be calculated based on a difference between a time point when the reflected ultrasonic signal corresponding to the computed target profile has been received and a time point when the corresponding ultrasonic signal was transmitted and a transmission speed of the ultrasonic signal, so as to determine the current position of the target object.

Based on the above, step S430 may include: determining whether one of the profile features of the objects acquired through simulation corresponds to the pre-stored model of the target object; if yes, determining the profile feature corresponding to the pre-stored model of the target object as the computed target profile, and calculating the distance between the center of the computed target profile and the distance sensor and the angle of the center of the computed target profile relative to the distance sensor so as to determine the current position of the target object; and if not, determining that the current position of the target object is located beyond the predetermined following range.

Step S440: output a movement state adjustment instruction to the driving mechanism based on the current position.

Step S440 may include: in the event that the current position of the target object is located beyond the predetermined following range, outputting a rotation direction adjustment instruction to the driving mechanism, continuously transmitting through the ultrasonic sensor the ultrasonic signal to the region in front of the body 100, simulating by the first controller the profile features of the objects based on the received distance signal, comparing the profile features of the objects acquired through simulation with the pre-stored model of the target object until the profiles of the objects acquired by simulation contain the profile matching the pre-stored model, determining that the target object has been found, and locating the target object within the predetermined following range; in the event that a distance between the target object and the body 100 is beyond the predetermined following range, outputting a movement speed increasement instruction to the driving mechanism, so as to increase a rotation speed of each Mecanum wheel 110, thereby enabling the distance between the body 100 and the target object to be within the predetermined following range; and in the event that the distance between the target object and the body 100 is less than a predetermined value, or in the event that a current movement speed of the target object is less than a predetermined speed, outputting a movement speed reduction instruction or a following stopping instruction to the driving mechanism, so as to maintain the distance between the body 100 and the target object within a predetermined range, or stop the body 100 in the event that the target object stops moving.

According to the method for controlling the circuit structure in the first embodiment of the present disclosure, a target object identification method different from any known method in the art is provided. To be specific, based on an ultrasonic distance-measurement technique, the plurality of ultrasonic sensors may be combined, and the distance signals from the plurality of ultrasonic sensors may be counted, so as to perform the object profile feature simulation. Then, the profiles of objects may be compared with the pre-stored model of the target object, so as to identify the target object. In this way, it is possible for the carrying device to follow a specific target object in a more accurate and efficient manner.

In addition, in the control method for the circuit structure in the first embodiment of the present disclosure, before use, the ultrasonic sensors may be used to scan the profile of the specific target object, so as to acquire and store the pre-stored model.

Figure 5:
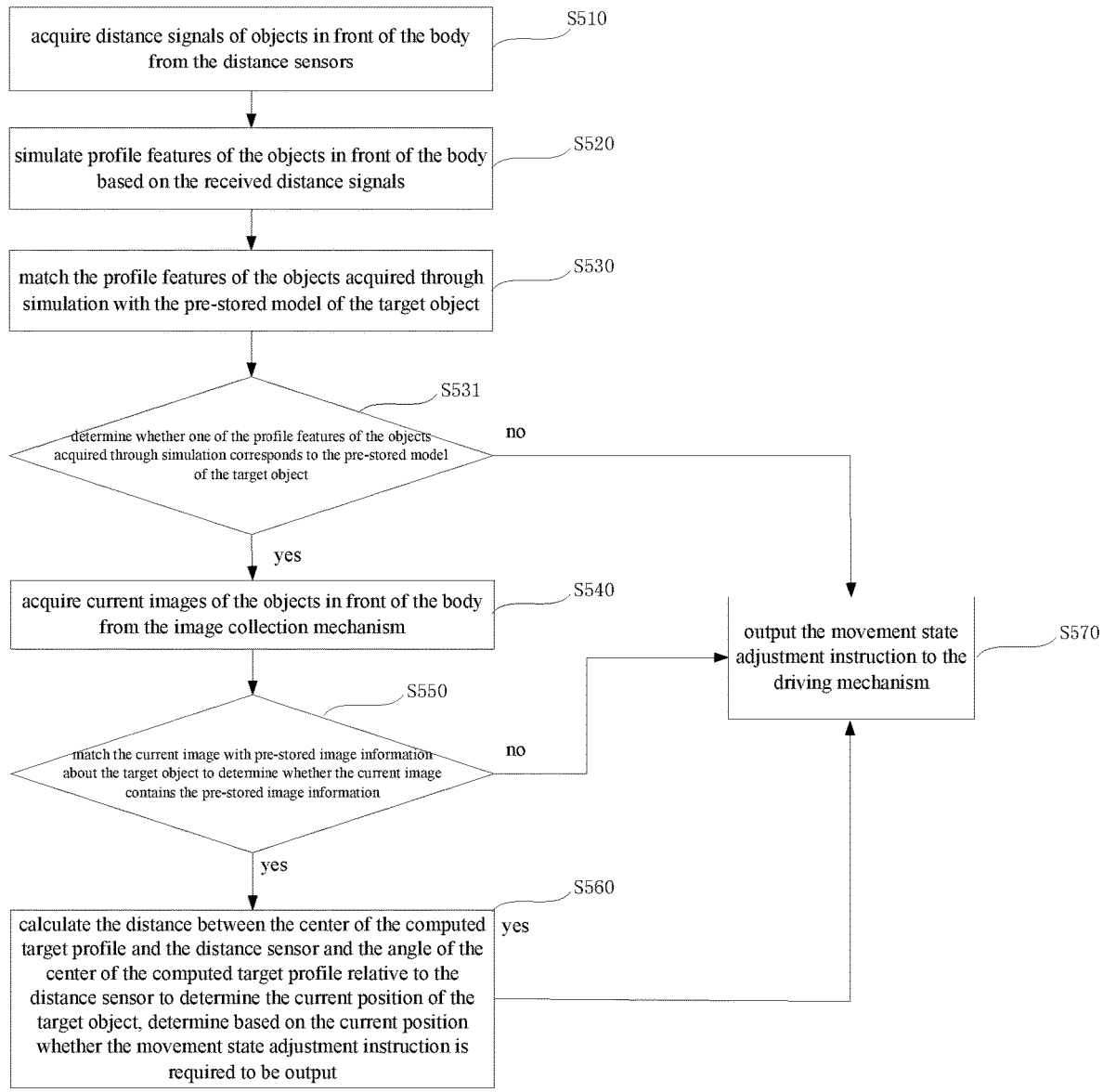
FIG. 5 is a flow chart of a method for controlling the carrying device according to the second embodiment of the present.

In the event that the carrying device adopts the control circuit structure as shown in FIG. 3, the step of determining the position of the target object based on the object information and outputting the control instruction to the driving mechanism so as to enable to the movement mechanism to drive the body to follow the target object may include steps S510 to S570, as shown in FIG. 5.

Step S510: acquire distance signals of objects in front of the body 100 from the distance sensors (i.e., the ultrasonic sensors).

To be specific, the plurality of ultrasonic sensors may transmit the ultrasonic signals in different directions to different positions in front of the body 100, and then receive the ultrasonic signals reflected by the objects in front of the body 100. Hence, the distance signal may include a plurality of reflected ultrasonic signals.

Step S520: simulate profile features of the objects in front of the body based on the received distance signals.

To be specific, it should be appreciated that the ultrasonic signals reflected by an identical object may have an identical feature. Upon the acquisition of data of the reflected ultrasonic signals, abnormal data points in the data may be filtered out using a median filtration algorithm. Then, the resultant data may be processed, i.e., subjected to clustering analysis using a nearest neighbor algorithm, so as to classify data points in the resultant data, and simulate profile features of the objects from which the ultrasonic signals are reflected.

Step S530: match the profile features of the objects acquired through simulation with the pre-stored model of the target object.

Step S531: determine whether one of the profile features of the objects acquired through simulation corresponds to the pre-stored model of the target object; if yes, determine the profile feature corresponding to the pre-stored model of the target object as the computed target profile and proceed to step S540; and if not, determine that the current position of the target object is located beyond the predetermined following range and proceed to step S570.

Step S540: acquire current images of the objects in front of the body from the image collection mechanism. The image collection mechanism may include at least one camera configured to acquire the current images of the objects in front of the body.

Step S550: match the current image with pre-stored image information about the target object to determine whether the current image contains the pre-stored image information; if not, determine that the computed target profile is not the profile of the target object and the determination result in step S530 is erroneous, and proceed to step S570; and if yes, determine that the computed target profile is the profile of the target object and the determination result in step S530 is correct, and proceed to step S560.

Step S560: calculate the distance between the center of the computed target profile and the distance sensor and the angle of the center of the computed target profile relative to the distance sensor to determine the current position of the target object, determine based on the current position whether the movement state adjustment instruction is required to be output, and if yes, proceed to step S570.

Step S570: output the movement state adjustment instruction to the driving mechanism.

Step S570 may include: in the event that the current position of the target object is located beyond the predetermined following range and the current image acquired by the camera does not contain the pre-stored image information, outputting the rotation direction adjustment instruction to the driving mechanism, continuously transmitting through the ultrasonic sensor the ultrasonic signal to the region in front of the body 100, simulating by the second controller the profile features of the objects based on the received distance signal, comparing by the second controller the profile features of the objects acquired through simulation with the pre-stored model of the target object until the profile features of the objects acquired through simulation contain the profile matching the pre-stored model, determining that the target object has been found and if the current image acquired by the camera contains an image identical to a pre-stored image, determining that the target object is located within the predetermined following range; in the case that the distance between the target object and the body 100 is beyond the predetermined following range, outputting the movement speed increasement instruction to the driving mechanism, so as to increase the rotation speed of each Mecanum wheel 110, thereby enabling the distance between the body 100 and the target object to be within the predetermined following range; and in the event that the distance between the target object and the body 100 is less than a predetermined value, or in the event that a current movement speed of the target object is less than a predetermined speed, outputting a movement speed reduction instruction or a following stopping instruction to the driving mechanism, so as to maintain the distance between the body 100 and the target object within the predetermined range, or stop the body 100 in the event that the target object stops moving.

In addition, the method may further include, before the use of the carrying device: receiving a start instruction through a control switch on the carrying device; acquiring a second distance signal of the target object in front of the body from the ultrasonic sensor in accordance with the start instruction; performing a feature simulation based on the second distance signal, so as to acquire and store the pre-stored model; and outputting the rotation direction adjustment instruction to the driving mechanism so as to drive the movement mechanism to change its direction, and enabling the camera to face toward the target object and collect image information about the target object and store the image information as the pre-stored image information.

In a possible embodiment of the present disclosure, the method may further include, subsequent to the step of collecting the image information about the target object: determining whether a stored image exists, and if yes, deleting the stored image, and storing the currently-acquired image information as the pre-stored image information; and if no, storing the image information as the pre-stored image information.

Through the above-mentioned steps, before the use of the carrying device, a control button may be used to trigger collecting automatically and storing the identity characteristics of the target object for the subsequent identification in the tracking procedure.

According to the method for controlling the circuit structure in the second embodiment of the present disclosure, the ultrasonic distance-measurement technique is adopted, the plurality of ultrasonic sensors may be combined, and the distance signals from the plurality of ultrasonic sensors may be counted, so as to simulate the profile of the followed object. The simulated profile of the followed object may be verified through the camera shooting technique. Through the combination of an image processing algorithm with an ultrasonic body recognition algorithm, it is possible to further ensure the accuracy and validity of following.

The present disclosure further provides in some embodiments a method for controlling the carrying device having the above-mentioned structure, which includes steps of: acquiring object information from an object information detector; and determining a position of a target object based on the object information, and outputting a control instruction to a driving mechanism, so as to enable a movement mechanism to drive a body of the carrying device to follow the target object.

To be specific, as shown in FIGS. 2 and 4, in the event that the object information detector includes a distance sensor, e.g., a plurality of ultrasonic sensors, the step of determining the position of the target object based on the object information, and outputting the control instruction to the driving mechanism so as to enable the movement mechanism to drive the body of the carrying device to follow the target object includes: simulating profile features of the objects in front of the body based on a distance signal of objects in front of the body acquired by the distance sensor, matching the profile features of the objects acquired through simulation with a pre-stored model of the target object, and determining a current position of the target object based on a matching result; and determining whether the current position is located within a predetermined following range, and if not, outputting a movement state adjustment instruction to the driving mechanism, so as to enable the movement mechanism to drive the body to follow the target object.

The step of matching the profile features of the objects acquired through simulation with the pre-stored model of the target object and determining the current position of the target object based on the matching result includes: determining whether one of the profile features of the objects acquired through simulation corresponds to the pre-stored model of the target object; if yes, determining the profile feature corresponding to the pre-stored model of the target object as a computed target profile, and calculating a distance between a center of the computed target profile and the distance sensor and an angle of the center of the computed target profile relative to the distance sensor so as to determine the current position of the target object; and if not, determining that the current position of the target object is located beyond the predetermined following range.

In addition, the step of outputting the movement state adjustment instruction to the driving mechanism includes outputting a movement speed adjustment instruction and/or a rotation direction adjustment instruction to the driving mechanism.

In addition, in the step of determining whether the current position is located within a predetermined following range, if it is determined that the current position is located within the predetermined following range, the method further includes: determining whether a current distance between the body and the target object is less than a predetermined value based on the current position, and if yes, outputting a following stopping instruction to the driving mechanism.

In this way, in the event that the distance between the carrying device and the target object is less than the predetermined value, the carrying device may automatically stop moving, so as to prevent the occurrence of collision.

According to the method of the embodiments of the present disclosure, through the ultrasonic distance-measurement technique, it is possible for the carrying device to follow the specific target object in a more accurate and efficient manner.

As shown in FIGS. 3 and 5, in the event that the object information detector includes a distance sensor and an image collection mechanism, the step of acquiring the object information from the object information detector includes: acquiring a first distance signal of objects in front of the body from the distance sensor and a current image of objects in front of the body from the image collection mechanism. The step of determining the position of the target object based on the object information and outputting the control instruction to the driving mechanism so as to enable the movement mechanism to drive the body to follow the target object includes: simulating profile features of the objects in front of the body based on the first distance signal, matching the profile features of the objects acquired through simulation with a pre-stored model of the target object, and determining a current position of the target object based on a matching result; in the event that the current position is located within a predetermined following range, matching the current image with pre-stored image information about the target object, so as to determine whether the current image contains the pre-stored image information; and in the event that the current image does not contain the pre-stored image information and the current position is not located within the predetermined following range, outputting a movement state adjustment instruction to the driving mechanism.

To be specific, the step of matching the profile features of the objects acquired through simulation with the pre-stored model of the target object and determining the current position of the target object based on the matching result includes: determining whether one of the profile feature of the objects acquired through simulation corresponds to the pre-stored model of the target object; if yes, determining the profile feature corresponding to the pre-stored model of the target object as a computed target profile, and calculating a distance between a center of the computed target profile and the distance sensor and an angle of the center of the computed target profile relative to the distance sensor, so as to determine the current position of the target object; and if not, determining that the current position of the target object is located beyond the predetermined following range.

In addition, the step of outputting the movement state adjustment instruction to the driving mechanism includes outputting a movement speed adjustment instruction and/or a rotation direction adjustment instruction to the driving mechanism.

In a possible embodiment of the present disclosure, the method further includes, prior to the step of acquiring the first distance signal of the objects in front of the body from the distance sensor and the current image of the objects in front of the body from the image collection mechanism: receiving a start instruction; acquiring a second distance signal of objects in front of the body from the distance sensor based on the start instruction; simulating profile features of the objects in front of the body based on the second distance signal, so as to acquire and store the pre-stored model; and outputting the rotation direction adjustment instruction to the driving mechanism so as to drive the movement mechanism to change its direction, and enabling the image collection mechanism to face toward the target object and collect image information about the target object and store the image information as the pre-stored image information.

In a possible embodiment of the present disclosure, the method further includes, subsequent to the step of enabling the image collection mechanism to collect the image information about the target object: determining whether a stored image exists, and if yes, deleting the stored image, and storing the currently-collected image information as the pre-stored image information.

Through the above-mentioned steps, before the use of the carrying device, a control button may be used to trigger collecting automatically and storing the identity characteristics of the target object for the subsequent identification in the tracking procedure.

In addition, in the step of determining whether the current position is located within a predetermined following range, if it is determined that the current position is located within the predetermined following range, the method further includes: determining whether a current distance between the body and the target body is smaller than a predetermined value based on the current position, and if yes, outputting a following stopping instruction to the driving mechanism.

In this way, in the event that the distance between the carrying device and the target object is smaller than the predetermined value, the carrying device may automatically stop moving, so as to prevent the occurrence of collision.

According to the method of the embodiments of the present disclosure, the combination of the ultrasonic distance-measurement technique and the shooting technique of the camera further ensure the accuracy and validity of following.

According to the carrying device and the method for controlling the carrying device in the embodiments of the present disclosure, through the movement mechanism capable of moving in all directions, e.g., the plurality of Mecanum wheels, it is possible to achieve movement convenience of the carrying device and it is convenient for the control mechanism to move the carrying device in various directions, thereby enlarging a range within which the object information detector may search for the target object. In addition, through the ultrasonic distance-measurement technique for object profile simulation and the shooting technique for verifying the simulated profiles of the objects, it is possible to further ensure the accuracy and validity of following. Further, it is possible to identify the object more quickly and ensure following autonomously the target object in a more accurate and efficient manner.

The above are merely optional embodiments of the present disclosure. It should be noted that a person skilled in the art may make further modifications and improvements without departing from the spirit of the present disclosure, and these modifications and improvements shall also fall within the scope of the present disclosure.

What is claimed is:

1. A carrying device, comprising:
   a body;

a movement mechanism arranged at a bottom of the body and capable of moving in a plurality of directions;

an object information detector arranged on the body and configured to collect object information about an object in front of the body;

a driving mechanism connected to the movement mechanism and configured to drive the movement mechanism to move; and a control mechanism configured to determine a position of a target object based on the object information, and output a control instruction to the driving mechanism to enable the movement mechanism to drive the body by adjusting the speed and/or a rotation direction to follow the target object;

wherein the object information detector comprises a distance sensor configured to acquire a distance signal of the object in front of the body, and the control mechanism comprises a first controller configured to determine the position of the target object based on the distance signal;

wherein the distance sensor comprises a plurality of ultrasonic sensors;

wherein the plurality of ultrasonic sensors is provided at different positions and is enabled to transmit a plurality of ultrasonic signals in different directions to different positions in front of the body, the plurality of ultrasonic sensors are combined to simulate a profile feature of the object in front of the body, so that the simulated profile feature of the object in front of the body can be matched with a pre-stored model of the target object to determine a current position of the target object based on a matching result.

2. The carrying device according to claim 1, wherein the object information detector further comprises: an image collection mechanism configured to acquire a current image of the object in front of the body, and the control mechanism comprises a second controller configured to determine the position of the target object based on the distance signal and the current image.

3. The carrying device according to claim 2, wherein the control mechanism is connected to the image collection mechanism via a Universal Serial Bus (USB) interface.

4. The carrying device according to claim 1, wherein the movement mechanism comprises a plurality of Mecanum wheels.

5. The carrying device according to claim 4, wherein the driving mechanism comprises a hub motor and a driver connected to the hub motor, the hub motor is connected to the Mecanum wheels, and the driver is connected to the control mechanism.

6. The carrying device according to claim 1, wherein the control mechanism is connected to the distance sensor via a RS232 interface.

7. The carrying device according to claim 1, wherein the body comprises an accommodation space for carrying an article.

8. A method of controlling a carrying device, the carrying device comprising:

a body;

a movement mechanism arranged at a bottom of the body and capable of moving in a plurality of directions;

an object information detector arranged on the body and configured to collect object information about an object in front of the body;

a driving mechanism connected to the movement mechanism and configured to drive the movement mechanism to move; and a control mechanism configured to determine a position of a target object based on the object information, and output a control instruction to the driving mechanism to enable the movement mechanism to drive the body by adjusting the speed and/or a rotation direction to follow the target object;

wherein the object information detector comprises a distance sensor configured to acquire a distance signal of the object in front of the body, and the control mechanism comprises a first controller configured to determine the position of the target object based on the distance signal;

wherein the distance sensor comprises a plurality of ultrasonic sensors;

wherein the plurality of ultrasonic sensors is provided at different positions and is enabled to transmit a plurality of ultrasonic signals in different directions to different positions in front of the body to simulate a profile feature of the object in front of the body;

the method comprising:

scanning the profile of a specific target object using the plurality of ultrasonic sensors, acquiring and storing a pre-stored model;

acquiring object information from an object information detector;

determining a position of a target object based on the object information, and outputting a control instruction to a driving mechanism to enable a movement mechanism to drive a body of the carrying device to follow the target object;

simulating the profile feature of the object in front of the body based on a distance signal of the object in front of the body acquired by the distance sensor, matching the simulated profile feature of the object in front of the body with the pre-stored model of the target object, and determining a current position of the target object based on a matching result; and determining whether the current position is located within a predetermined following range, and if not, outputting a movement state adjustment instruction to the driving mechanism to enable the movement mechanism to drive the body to follow the target object;

combining the plurality of ultrasonic sensors, and counting the distance signals from the plurality of ultrasonic sensors to perform the object profile feature simulation.

9. The method according to claim 8, wherein the step of matching the simulated profile feature of the object in front of the body with a pre-stored model of the target object and determining a current position of the target object based on a matching result comprises:

determining whether one of the simulated profile feature of the object in front of the body corresponds to the pre-stored model of the target object;

if yes, determining the one of the simulated profile feature corresponding to the pre-stored model of the target object as a computed target profile, and calculating a distance between a center of the computed target profile and the distance sensor and an angle of the center of the computed target profile relative to the distance sensor to determine the current position of the target object; and if not, determining that the current position of the target object is located beyond the predetermined following range.

10. The method according to claim 8, wherein the step of outputting a movement state adjustment instruction to the driving mechanism comprises: outputting a movement speed adjustment instruction and/or a rotation direction adjustment instruction to the driving mechanism.

11. The method according to claim 8, wherein in the event that in the step of determining whether the current position is located within a predetermined following range, the current position is determined to be located within the predetermined following range, the method further comprises: determining whether a current distance between the body and the target object is less than a predetermined value based on the current position, and if yes, outputting a following stopping instruction to the driving mechanism.

12. The method according to claim 8, wherein in the event that the object information detector comprises a distance sensor and an image collection mechanism, the step of acquiring object information from the object information detector further comprises: acquiring a current image of the object in front of the body from the image collection mechanism, and the step of determining a position of the target object based on the object information and outputting a control instruction to the driving mechanism to enable the movement mechanism to drive the body to follow the target object further comprises:

in the event that the current position is located within a predetermined following range, matching the current image with pre-stored image information about the target object to determine whether the current image comprises the pre-stored image information; and in the event that the current image does not comprise the pre-stored image information and the current position is not located within the predetermined following range, outputting a movement state adjustment instruction to the driving mechanism.

13. The method according to claim 12, wherein the step of matching the simulated profile feature of the object in front of the body with a pre-stored model of the target object and determining a current position of the target object based on a matching result comprises:

determining whether one of the simulated profile feature of the object in front of the body corresponds to the pre-stored model of the target object;

if yes, determining the one of the simulated profile feature corresponding to the pre-stored model of the target object as a computed target profile, and calculating a distance between a center of the computed target profile and the distance sensor and an angle of the center of the computed target profile relative to the distance sensor to determine the current position of the target object; and if not, determining that the current position of the target object is located beyond the predetermined following range.

14. The method according to claim 12, wherein the step of outputting a movement state adjustment instruction to the driving mechanism comprises: outputting a movement speed adjustment instruction and/or a rotation direction adjustment instruction to the driving mechanism.

15. The method according to claim 12, wherein the method further comprises, prior to the step of acquiring a first distance signal of the object in front of the body from the distance sensor and a current image of each object in front of the body from the image collection mechanism:

receiving a start instruction;

acquiring a second distance signal of the object in front of the body from the distance sensor based on the start instruction; and performing a feature simulation based on the second distance signal to acquire and store the pre-stored model.

16. The method according to claim 15, wherein the method further comprises, subsequent to the step of performing a feature simulation based on the second distance signal to acquire and store the pre-stored model: outputting a rotation direction adjustment instruction to the driving mechanism to change a direction of the movement mechanism, and enabling the image collection mechanism to face toward the target object and collect image information about the target object and store the image information as the pre-stored image information.

17. The method according to claim 16, wherein the method further comprises, subsequent to the step of enabling the image collection mechanism to collect image information about the target object: determining whether a stored image exists, and if yes, deleting the stored image, and storing the currently-collected image information as the pre-stored image information.

18. The method according to claim 8, wherein the simulating a profile feature of the object in front of the body comprises:

filtering out abnormal data points in data using a median filtration algorithm when acquiring of the data of reflected ultrasonic signals;

processing the data using a nearest neighbor algorithm for clustering analysis;

classifying data points in the data and simulating profile features of the object from which the ultrasonic signals are reflected.

* * * * *